United States Patent
Ledger et al.

(10) Patent No.: US 8,905,628 B2
(45) Date of Patent: Dec. 9, 2014

(54) BLENDING AND DISPENSING APPLIANCE

(75) Inventors: Scott Ledger, Wellington, FL (US); Augusto Picozza, Boca Raton, FL (US); David Swett, Waltham, MA (US)

(73) Assignee: Sunbeam Products, Inc., Boca Raton, FL (US)

( * ) Notice: Subject to any disclaimer, the term of this patent is extended or adjusted under 35 U.S.C. 154(b) by 0 days.

(21) Appl. No.: 13/579,348

(22) PCT Filed: Feb. 23, 2011

(86) PCT No.: PCT/US2011/025814
§ 371 (c)(1),
(2), (4) Date: Aug. 16, 2012

(87) PCT Pub. No.: WO2011/106350
PCT Pub. Date: Sep. 1, 2011

(65) Prior Publication Data
US 2013/0183426 A1 Jul. 18, 2013

(51) Int. Cl.
*A47J 43/046* (2006.01)
*B01F 15/02* (2006.01)
*A47J 43/042* (2006.01)
*B01F 7/16* (2006.01)

(52) U.S. Cl.
CPC .......... *B01F 15/0288* (2013.01); *A47J 43/042* (2013.01); *B01F 7/162* (2013.01); *B01F 15/0289* (2013.01); *B01F 2215/0021* (2013.01); *B01F 2215/0022* (2013.01)
USPC ............................. 366/186; 366/194; 366/206

(58) Field of Classification Search
USPC ................. 366/186, 189, 192–196, 205, 206; 241/282.1, 282.2; 222/566–574
See application file for complete search history.

(56) References Cited

U.S. PATENT DOCUMENTS

| | | | | |
|---|---|---|---|---|
| 1,809,363 A | * | 6/1931 | Teare | 241/152.2 |
| 1,874,079 A | * | 8/1932 | Black | 241/97 |
| 2,070,545 A | * | 2/1937 | Gilbert | 366/164.6 |
| 2,315,018 A | * | 3/1943 | Lawrence | 99/501 |
| 3,800,745 A | * | 4/1974 | Fassauer | 119/51.11 |
| 3,837,587 A | * | 9/1974 | Walter et al. | 241/260.1 |
| 3,920,224 A | * | 11/1975 | Fassauer | 366/131 |
| 4,201,487 A | * | 5/1980 | Backhaus | 366/304 |
| 4,497,580 A | * | 2/1985 | Doyel | 366/190 |
| 4,513,688 A | * | 4/1985 | Fassauer | 119/57.1 |

(Continued)

FOREIGN PATENT DOCUMENTS

| | | | | |
|---|---|---|---|---|
| JP | 2004041286 A | * | 2/2004 | A47J 43/046 |
| JP | 2004065325 A | * | 3/2004 | A47J 43/046 |
| WO | WO 2006081113 A2 | * | 8/2006 | |

*Primary Examiner* — Charles Cooley
(74) *Attorney, Agent, or Firm* — Michael J. Corrigan

(57) ABSTRACT

A blending and dispensing appliance is provided which includes a blending container, a housing having a recess for receiving and supporting the blending container, and an agitator to agitate contents placed therein. A conduit is disposed on an outer sidewall of the blending container and fluidly connected to the blending container. An auger is disposed in the conduit and is rotated within the conduit when a dispensing arm is depressed. The rotating auger extrudes blended contents through the conduit from the blending container to a dispensing spout for further directing the blended contents into a beverage container. A motorized base containing both an agitator and auger motor selectively provide rotary power to the agitator and auger, respectively. A control system is provided for controlling the operation of auger and the agitator so that the contents placed into the beverage container are blended to a desired consistency.

24 Claims, 12 Drawing Sheets

(56) References Cited

U.S. PATENT DOCUMENTS

| | | | |
|---|---|---|---|
| 6,431,744 B1 * | 8/2002 | Ash et al. | 366/205 |
| D463,194 S * | 9/2002 | Busick et al. | D7/313 |
| 6,527,433 B2 * | 3/2003 | Daniels, Jr. | 366/205 |
| D473,421 S * | 4/2003 | Daniels, Jr. | D7/378 |
| D474,065 S * | 5/2003 | Daniels, Jr. | D7/378 |
| D474,067 S * | 5/2003 | Daniels, Jr. | D7/386 |
| D474,643 S * | 5/2003 | Daniels, Jr. | D7/386 |
| 6,595,121 B1 * | 7/2003 | Chang Chien | 99/510 |
| D483,607 S * | 12/2003 | Chang Chien | D7/384 |
| D503,869 S * | 4/2005 | Hei | D7/378 |
| D504,277 S * | 4/2005 | Hei | D7/378 |
| 6,935,767 B2 * | 8/2005 | Nikkhah | 366/129 |
| 6,966,689 B2 * | 11/2005 | Daniels, Jr. | 366/192 |
| 6,981,795 B2 * | 1/2006 | Nikkah | 366/199 |
| D520,808 S * | 5/2006 | Beesley et al. | D7/378 |
| D525,481 S * | 7/2006 | Kassenaar | D7/378 |
| 7,213,965 B2 * | 5/2007 | Daniels, Jr. | 366/192 |
| 7,217,028 B2 * | 5/2007 | Beesley | 366/199 |
| 7,263,926 B2 * | 9/2007 | Chang Chien | 99/510 |
| 7,270,156 B2 * | 9/2007 | Beesley et al. | 141/82 |
| D551,915 S * | 10/2007 | Chang Chien | D7/665 |
| D552,412 S * | 10/2007 | Steiner | D7/378 |
| 7,278,779 B2 * | 10/2007 | Beesley et al. | 366/205 |
| D563,154 S * | 3/2008 | Comstock et al. | D7/378 |
| 7,422,361 B2 * | 9/2008 | Pryor, Jr. et al. | 366/197 |
| 7,665,885 B2 * | 2/2010 | Pryor, Jr. | 366/197 |
| 7,673,824 B2 * | 3/2010 | Stamper et al. | 241/97 |
| 7,871,195 B2 * | 1/2011 | Larsen et al. | 366/194 |
| 7,918,601 B2 * | 4/2011 | Branson et al. | 366/192 |
| 2002/0080678 A1 * | 6/2002 | Daniels, Jr. | 366/205 |
| 2003/0099154 A1 * | 5/2003 | Daniels, Jr. | 366/191 |
| 2005/0018532 A1 * | 1/2005 | Nikkah | 366/129 |
| 2005/0018534 A1 * | 1/2005 | Nikkah | 366/205 |
| 2005/0045671 A1 * | 3/2005 | Beesley et al. | 222/559 |
| 2005/0185507 A1 * | 8/2005 | Beesley et al. | 366/205 |
| 2005/0199534 A1 * | 9/2005 | Daniels, Jr. | 210/100 |
| 2005/0207270 A1 * | 9/2005 | Beesley | 366/205 |
| 2005/0257690 A1 | 11/2005 | Katz et al. | |
| 2006/0176765 A1 * | 8/2006 | Pryor et al. | 366/192 |
| 2007/0041268 A1 * | 2/2007 | Beesley et al. | 366/195 |
| 2007/0137492 A1 * | 6/2007 | Stamper et al. | 99/275 |
| 2007/0165484 A1 * | 7/2007 | Branson et al. | 366/192 |
| 2008/0031087 A1 * | 2/2008 | Pryor | 366/194 |
| 2008/0089170 A1 * | 4/2008 | Larsen et al. | 366/192 |
| 2008/0089171 A1 * | 4/2008 | Larsen et al. | 366/206 |
| 2009/0161482 A1 * | 6/2009 | Sandford | 366/192 |
| 2010/0027373 A1 | 2/2010 | Barnard et al. | |
| 2013/0183426 A1 * | 7/2013 | Ledger et al. | 426/519 |

* cited by examiner

BLENDING AND DISPENSING APPLIANCE

FIELD OF THE INVENTION

The invention relates to blending and more particularly to a blending and dispensing appliance that includes a motorized auger that feeds a blended beverage product to a dispensing spout when a dispensing arm is depressed.

BACKGROUND OF THE INVENTION

Blending appliances are known in the art. Typically, blending appliances include a mixing container, an motorized base, and a lid. Such blenders dispense blended contents by removing the lid from the mixing container, lifting the mixing container from the base, and pouring the blended contents from the mixing container into a drinking vessel. However, these blending appliances suffer drawbacks including the mixing container being heavy when full making it easy to spill blended contents. In addition, thick drinks like margaritas, smoothies and milk shakes that flow irregular from the mixing container may result in overfilling and spilling.

Blending appliances with spout dispensers are also known in the art. Typically, such blending appliances include a mixing container, a motorized base, a lid, and a spout extending from the mixing container. The spout may include a lever that is depressed for dispensing blended contents into a drinking vessel positioned beneath the spout. However, such an arrangement suffers from drawbacks such as highly viscous drinks like milkshakes do not dispense easily from the spout. In addition, during blending solids may get pushed into the dispensing spout and clog or limit flow of the blended contents. Last, consumers do not feel the spout may be cleaned easily and reliably.

SUMMARY OF THE INVENTION

In an aspect of the invention, there is provided a blending and dispensing appliance, which may include a blending container, a housing for receiving and supporting the blending container, an agitator disposed in the blending container configured to agitate contents placed into the blending container, a motorized base disposed in the housing and configured to couple to the agitator to selectively provide rotary power to the agitator, a conduit disposed on an outer sidewall of the blending container and fluidly connected to the blending container at a first end, a port for fluidly connecting the blending container to the first end of the conduit, and an auger disposed within the conduit and configured to rotate in both a first and second direction within the conduit, said auger being rotatably coupled to the motorized base to selectively pump blended contents from within the blending container through said port and said first end of the conduit to a second end of said conduit when rotated in the first direction.

In another aspect of the invention, there is provided a method of blending and dispensing a beverage which may include the steps of placing ingredients to be blended into a container, blending the ingredients in the container with an agitator, selectively rotating an auger within a conduit disposed on a sidewall and fluidly connected to the container, and dispensing the blended contents from the conduit into a beverage container.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details. Furthermore, well-known features may be omitted or simplified in order not to obscure the present invention.

A blending and dispensing appliance for preparing and dispensing beverages of a desired consistency such as slush drinks is provided. The appliance includes a motorized auger that extrudes blending beverages through a conduit to a dispensing spout when a dispensing arm is depressed. The use of the motorized auger and conduit allows for dispensing blended beverages such as slush drinks containing particulate matter which may otherwise clog beverage dispensers.

Figure 1:
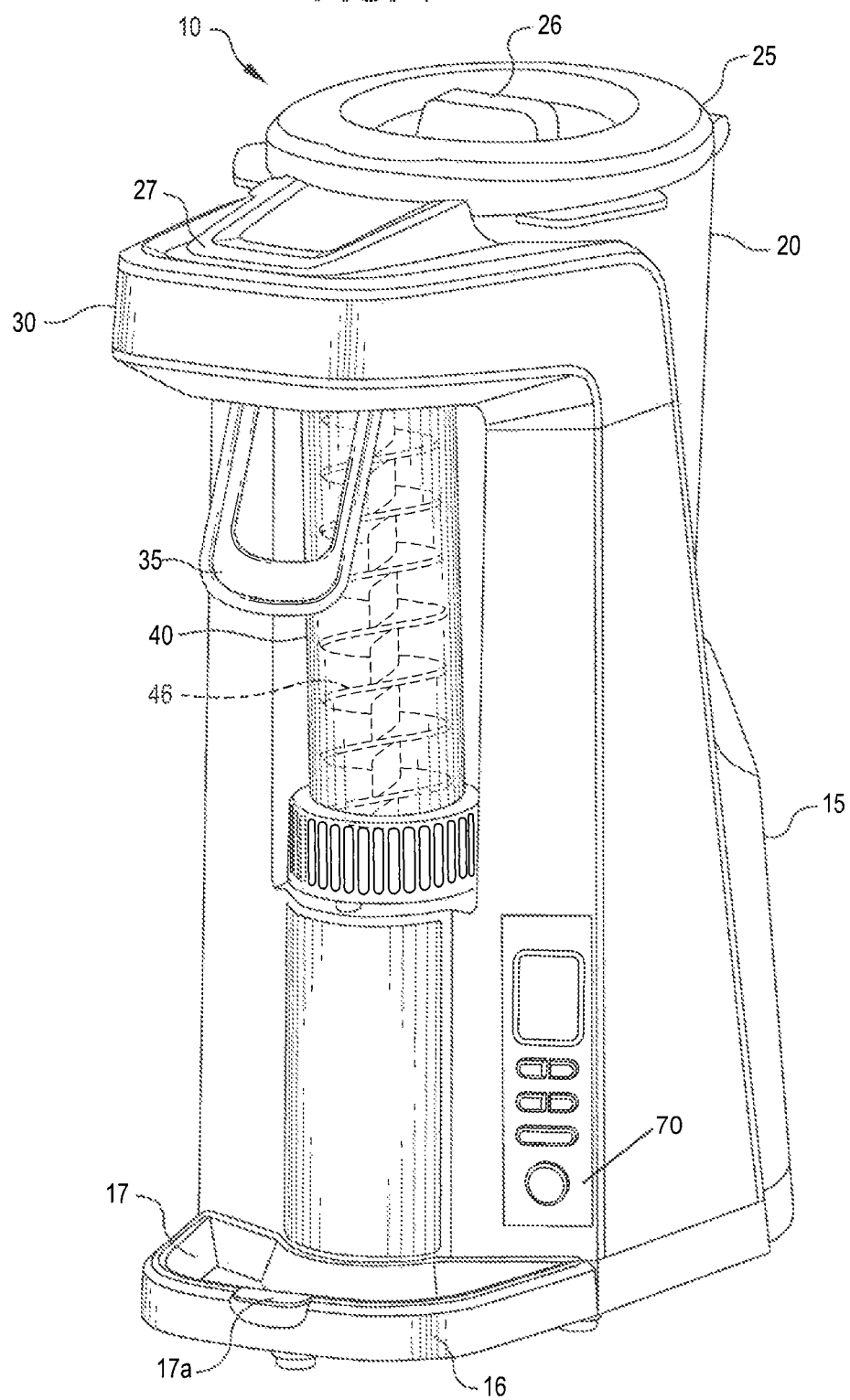
FIG. 1 is a front perspective view of an embodiment of a blending and dispensing appliance.
Figure 2:
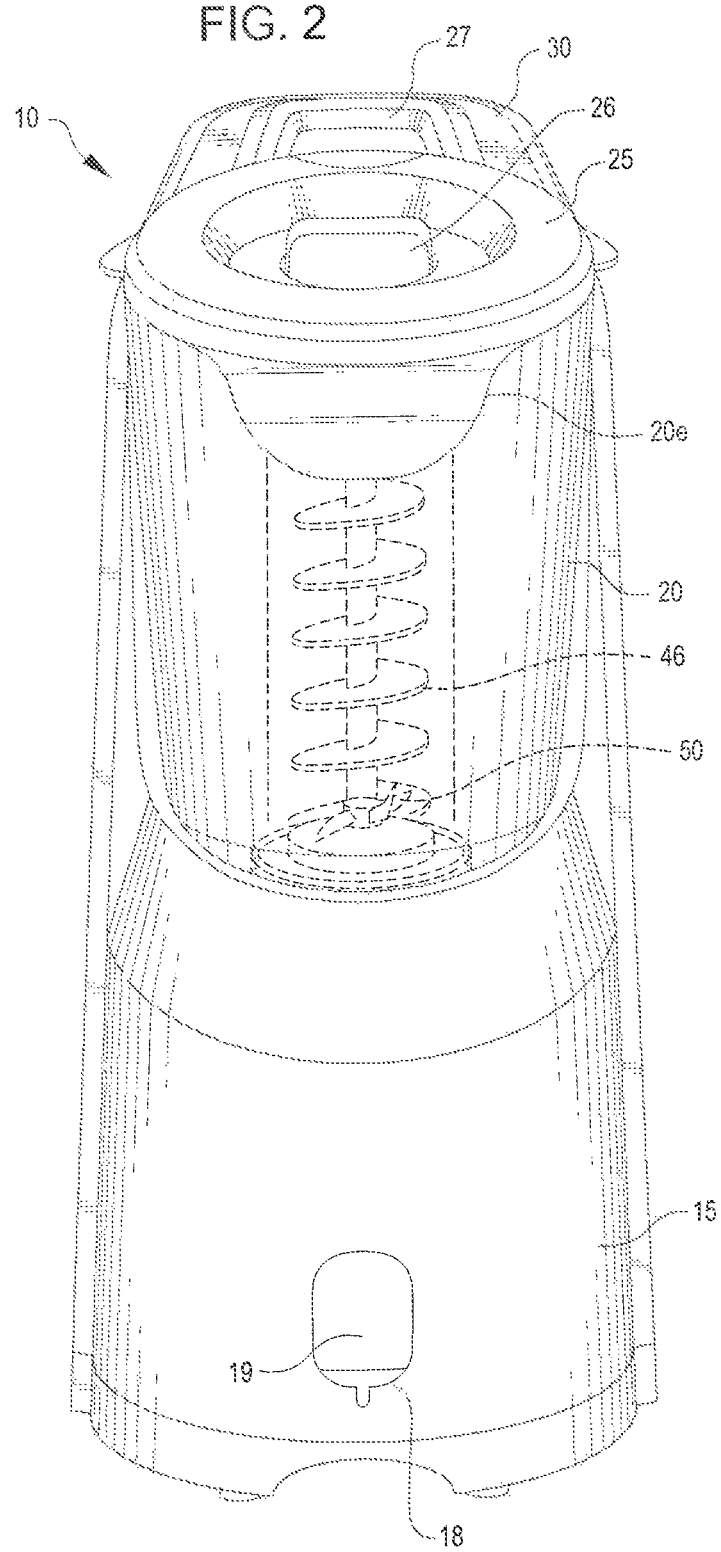
FIG. 2 is a rear perspective view of the appliance of FIG. 1.
Figure 3:
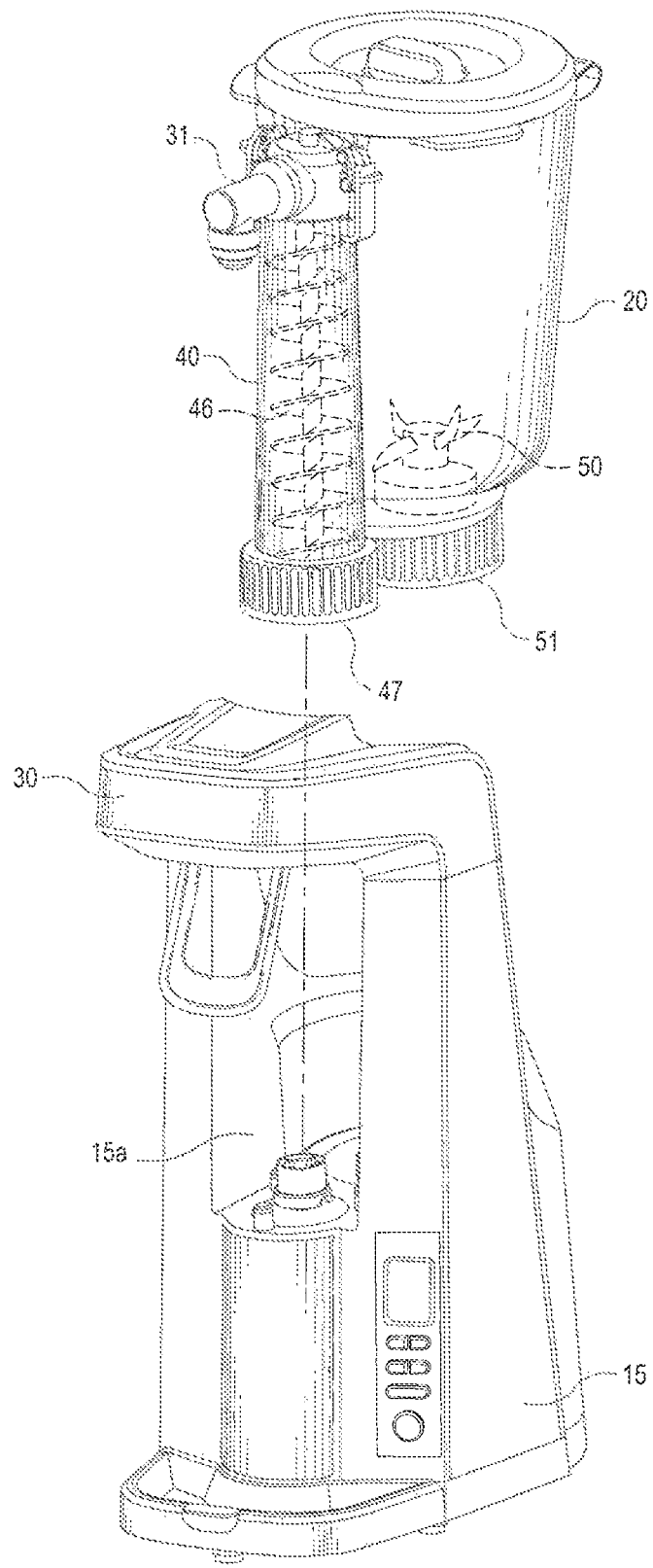
FIG. 3 is another front perspective view of the appliance of FIG. 1 with the blending container removed from the motorized base.

Referring now to the drawing figures in which like reference designators refer to like elements, there is shown in FIGS. 1-3 an embodiment of a blending and dispensing appliance 10. The blending and dispensing appliance 10 is for preparing and dispensing blended beverages which may include but are not limited to thick drinks such as milkshakes, smoothies, slushies, frozen drinks, margaritas, daiquiris, granitas, fruit drinks, iced coffees and teas, and the like.

The blending and dispensing appliance 10 may include a reversible motorized auger 46 and a feed column or conduit 40 integrally firmed in a sidewall of a blending jar 20. The auger 46 and feed column 40 aids in dispensing chunky blended contents through a dispensing nozzle assembly 31 which might otherwise clog the dispensing nozzle assembly 31. The dispensing nozzle assembly 31 allows blended contents to be dispensed into individual beverage serving containers without having to lift and pour directly from the blending jar 20. The blended contents is dispensed by placing a beverage serving container underneath a dispensing spout 31a of the dispensing nozzle assembly 31 and depressing a dispensing arm 35 with a beverage serving container.

The blending appliance 10 includes a housing 15, blending jar or container 20, blending container lid 25, upper housing assembly 30, dispensing nozzle assembly 31, dispensing arm 35, feed column 40, motorized auger 46, agitator assembly 50, and an electronic control panel 70. The dispensing nozzle assembly 31 and dispensing arm 35 are disposed in an upper portion of the housing 30 that overhangs from the top of the lower portion of the housing 15. The dispensing arm 35 is pivotally attached to the upper housing assembly 30 and biased into the non-dispensing position by a spring (not shown). The control panel 70 is provided electrical power by an electrical cord (not shown) that may be stored in a recess 19 in the housing 15 accessed through an opening 18 at the rear of the appliance 10. The control panel 70 may include an lcd display panel 75 (FIG. 12) for displaying information about the operation of the appliance 10 to a user.

The blending jar 20 is removably mounted in a recess 15a in the base 15 for cleaning. The lid 25 is fitted into an opening 20a (FIG. 4) at one end of the blending jar 20 for sealing the blending jar 20 during blending. The lid 25 may include a twist knob 26 which may be removed during blending to add additional ingredients through an opening 25a (FIG. 4) in the lid 25. The blending jar 20 may include a lip 20e (FIG. 4) extending from the upper end to aid in gripping the blending jar 20. A hinged cover 27 is provided in the upper housing for allowing easy access to the dispensing nozzle assembly 31 when the blending jar 20 is mounted in the base 15.

In an embodiment, the blending jar 20 may hold approximately eight to ten cups (64-80 fluid ounces) of blended contents. The blending jar 20 may be formed of an impact resistant material such as glass, plastic or any other suitable, non-toxic material. Additionally, the inside of the bending jar 20 may be coated with a non-stick coating such as polytetrafluoroethylene TEFLON and the like to allow for better mixing and cleaning. The blending jar 20 may be transparent and include volume lines on the sidewall to illustrate the proper amounts of ice and liquid to use for making a particular drink (e.g., a frozen margarita).

In an embodiment, a drip tray 16 extends from the lower front of the housing 15 for catching spills from dispensing spout 31. A removable liner may be inserted 17 into the drip tray 16 which is removed for emptying of the spilled contents. A latch 17a secures the liner 17 into the drip tray 16 during use.

Figure 4:
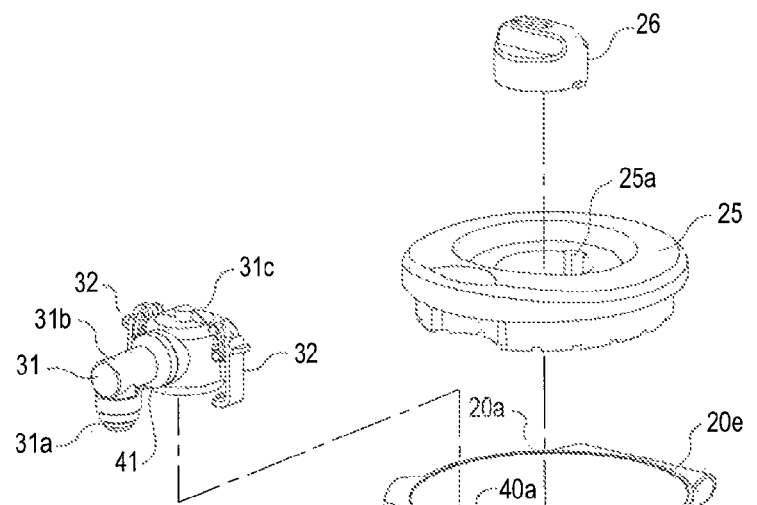
FIG. 4 is another front perspective view of the appliance of FIG. 1 with the blending container exploded and removed from the motorized base.
Figure 4:
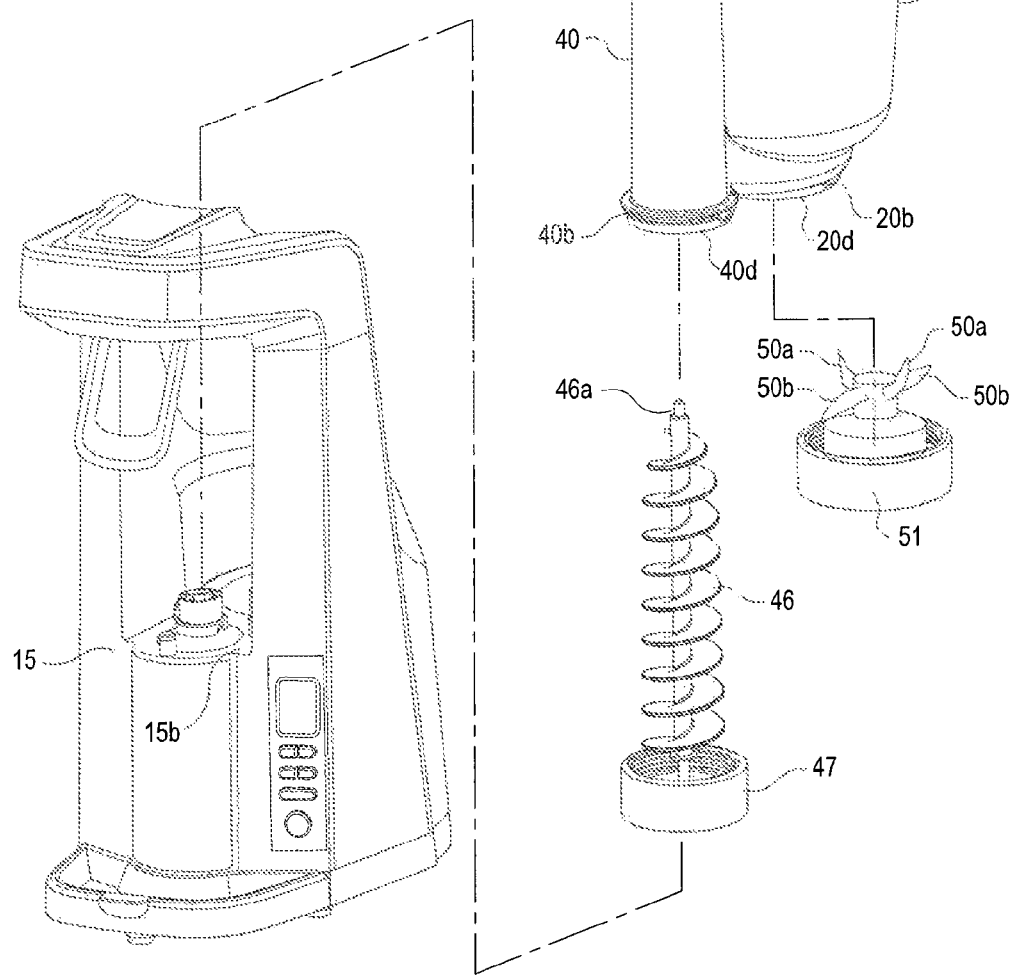

The blending jar 20 includes an the agitator assembly 50 at the lower end for blending contents inserted into the blending jar 20 through the opening 20a (FIG. 4) when the lid 25 is removed. The agitator assembly 50 is operated and controlled by electronic controls on the electronic control panel 70 (see also FIG. 12) for agitating and blending ingredients to a desired consistency. The agitator assembly 50 includes any number of blades, but preferably includes at least one generally U-shaped blade such as is used in contemporary blenders. In addition, the agitator assembly may include a second U-shaped blade. In the illustrated embodiment, the agitator assembly 50 includes a first or top blade assembly 50a (FIG. 4) and a second or bottom blade assembly 50b (FIG. 4). The respective blade assemblies 50a and 50b are preferably designed to be rotated in forward and reverse directions, and/or may be oscillated. The operation of the agitator assembly 50 via the electronic controls on the control panel 70 is described in detail hereinbelow.

The motorized auger 46 is energized and rotated in a forward or first direction when the dispensing arm 35 is depressed. A contact switch S1 (FIG. 5) disposed in the upper housing 30 is closed when the dispensing arm 35 is depressed causing an electrical signal to be sent to a microprocessor MP1 (FIG. 13) controlling an auger motor 49 (FIGS. 5 and 8) disposed in the housing 15. When energized the auger motor 49 rotates the auger 46. The rotating auger 46 feeds blended contents from a sump at the bottom of the blending jar 20 and extrudes the blended contents through the feed column 40 formed on the sidewall of the blending jar 20 to the dispensing nozzle assembly 31. A dispensing spout 31a (FIG. 4) of the dispensing nozzle assembly 31 directs blended contents from the feed column 40 into a beverage serving cup (not shown) disposed beneath.

Oppositely, the motorized auger 46 is energized and rotated in a reverse or second direction when the agitator assembly 50 is energized via the electronic controls on control panel 70. Rotating the motorized auger 46 in the reverse direction during agitation of the contents in the blending jar 20 causes any blended contents in the feed column 40 to be forced back down into the sump and into the blending jar 20. This prevents any contents in the blending jar 20 not fully blended from being fed through the feed column 40 and being dispensed through the dispensing nozzle assembly 31 while the agitator assembly 50 is energized.

Referring now to FIG. 4, the dispensing nozzle assembly 31 removably attaches to the upper end of the feed column 40. Latches 32 on dispensing nozzle assembly 31 engage projections 40c on the upper end of feed column 40. The dispensing nozzle assembly 31 may be removed from feed column 40 for cleaning. The auger 46 is rotatably coupled to an auger nut 47 at the lower end. The auger 46 is inserted into an opening 40d at the lower end of the feed tube 40 and is secured therein with the auger nut 47. The auger nut 47 may be threaded and engages complementary threads 40b on the lower end of the feed column 40. A spindle 46a at the upper end of the auger 46 is inserted into a recess (not shown) in the main body 31c of the dispensing nozzle assembly 31 when assembled. The agitator assembly 50 is inserted into an opening 20d on the lower end of the blending jar 20. The agitator assembly 50 may be secured thereon with threads that may engage complementary threads 20b on the lower end of the blending jar 20. The lid 25 is fitted into an opening 20a at the upper end of the blending jar 20.

Figure 5:
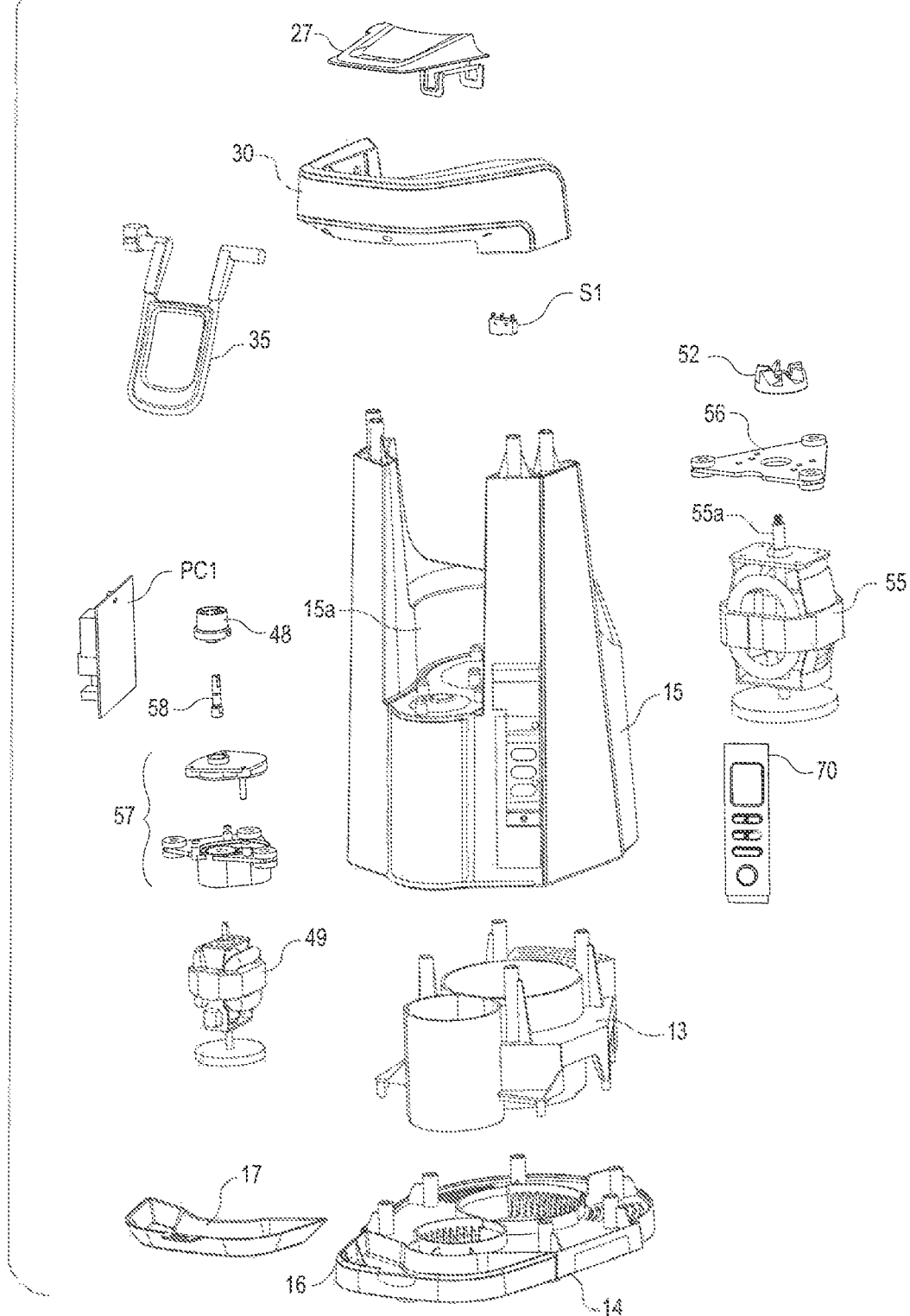
FIG. 5 is an exploded front perspective view of the motorized base of the appliance of FIG. 1.

Referring now to FIG. 5, the drip tray 16 is formed in a front portion of a base 14. A motor cover 13 fits onto the base 14. Both the auger motor 49 and agitator motor 55 are fitted into recesses in the motor cover 13. The motor cover 13 is inserted into the housing 15 and sandwiched between the base 14 and the housing 15. A motor guide plate 56 may be used to attach the agitator motor 55 to the housing 15. A gear box 57 is disposed above the auger motor 49 and rotatably connects via shaft 58 the auger motor 49 to an auger drive member 48 located in the recess 15a in the housing 15. A drive shaft 55a of the agitator motor 55 is rotatably connected to an agitator drive member 52 disposed in the recess 15a. A contact switch S1 controlling the operation of the auger motor 49 is disposed in the upper housing 30. The contact switch S1 may be any kind of mechanical or electrical switch, which sends a signal or command, or closes/opens a circuit when actuated. The dispensing arm 35 is pivotally attached the upper housing 30 and contacts the contact switch S1 when depressed. A circuit board PC1 controlling the operation of the auger motor 49 and the agitator motor 55 may be disposed in the housing 15. The control panel 70 may be disposed on the front of the housing 15 and is electrically connected to the circuit board PC1.

Figure 6:
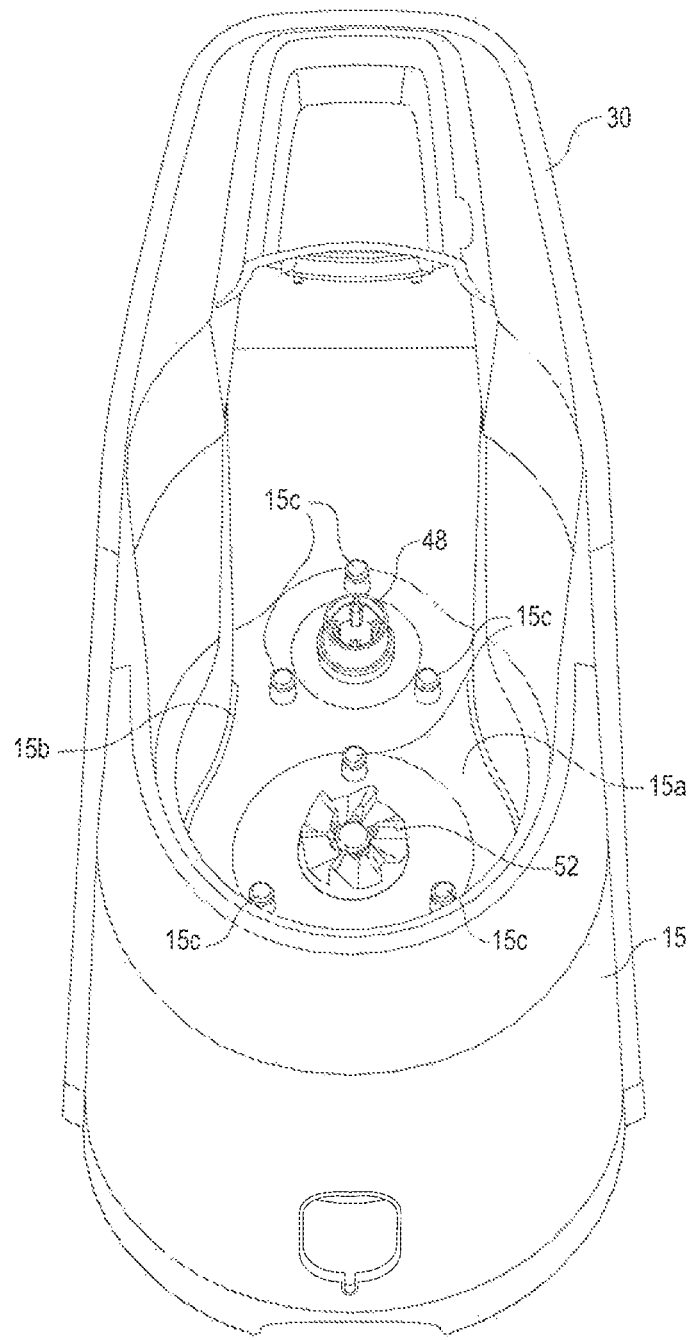
FIG. 6 is top rear perspective view of the motorized base of the appliance of FIG. 1.

Referring now to FIG. 6, the assembled blending jar 20 (best seen in FIG. 3) is inserted into a recess 15a in base 15 during use. One or more projections 15c extend upwardly from a surface 15b partially defining recess 15a. The one or more projections 15c engage complementary apertures in auger nut 47 (FIGS. 3 and 4) and jar nut 51 (FIGS. 3 and 4) for aligning the blending jar 20/feed column 40 assembly when inserted into recess 15a. Surface 15b may be slightly sloped towards the front of housing 15 so that spill from blending jar 20 will drain into liner 17 of drip tray 16 (FIG. 1).

A rotary auger drive member 48 is disposed on the surface 15 which engages a complementary auger drive member (not shown) disposed on the bottom of auger nut 47 (FIG. 4). The rotary auger drive member 48 is rotatably coupled to an auger drive motor 49 (best seen in FIG. 8) disposed beneath in the housing 15. The auger drive member 48 transmits rotational power from the auger drive motor 49 (FIG. 8) to the auger 46 (FIG. 8) when the auger drive motor 49 (FIG. 8) is energized. In the illustrated embodiment, the auger drive member 48 is a female splined socket designed to receive a complementary splined shaft (not shown) protruding from the bottom of the auger nut 47 (FIGS. 3 and 4). However, this is not meant to be limiting as any auger drive member 48 and complementary auger drive member (not shown) disposed on the bottom of auger nut 47 (FIGS. 3 and 4) may be used as known to one of ordinary skill in the art.

A rotary agitator drive member 52 is disposed on the surface 15b which engages a complementary drive member (not shown) disposed on the bottom of jar nut 51 (FIGS. 3 and 4). The rotary agitator drive member 52 is rotatably coupled to an agitator drive motor 55 (best seen in FIG. 8) disposed in the base 15. The agitator drive member 52 transmits rotational power from the agitator drive motor 55 (FIG. 8) to the agitator assembly 50 when the agitator drive motor 55 (FIG. 8) is energized. In the illustrated embodiment, the agitator drive member 52 is the familiar "star pattern" coupling member designed to receive a complementary "star pattern" coupling member (not shown) on the bottom of the agitator nut 51 (FIGS. 3 and 4). However, this is not meant to be limiting as any configuration of the agitator drive member 52 and complementary agitator drive member (not shown) disposed on the bottom of agitator nut 51 (FIGS. 3 and 4) may be used as known to one of ordinary skill in the art.

Referring now to FIGS. 7-10, in the illustrated embodiment a plurality apertures 40a (shown with greater clarity in the enlarged area A in FIG. 10) are formed in the sidewall of the blending jar 20 where it is attached to the sidewall of the feed column 40. The apertures 40a open into the feed column 40 such that blended contents from within the interior volume 20f of the blending jar 20 may be fed into the feed column 40. Thus, blended contents at the bottom or sump of the blended jar 20 is fed into the feed column 40 to the dispensing nozzle assembly 31 when the auger 46 is rotated in the forward direction during dispensing.

The number of apertures 40a, their dimensions, and the size and contour of the blending jar 20 are optimized to ensure the flow of blended beverage from blending jar 20 to auger 46 and feed column 40 and proper dispensing through dispensing nozzle assembly 31. In the illustrated embodiment, there are four apertures 40a. However, this is not meant to be limiting as the exact number and dimensions of apertures 40a may vary according to design requirements for optimum flow of blended contents between blending jar 20 and feed column 40.

Oppositely, the apertures 40a allow blended contents in feed column 40 to be extruded or forced back into the blending jar 20 when the auger 46 is rotated in the reverse direction while the agitator assembly 50 is being rotated. This prevents blended beverage from being dispensed during operation of agitator assembly 50 and the buildup of particulate matter such as ice and fruit in the area of the apertures 40a.

Figure 11:
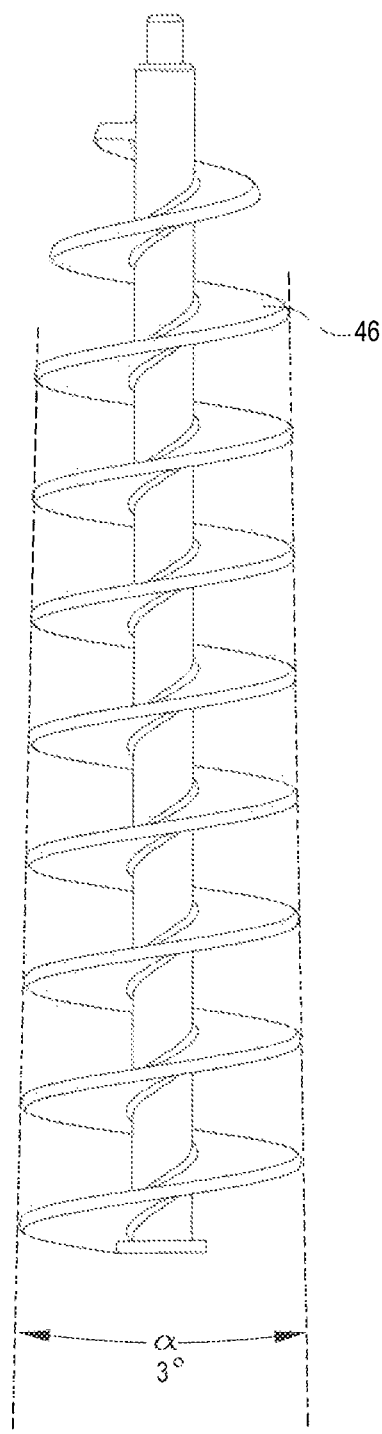
FIG. 11 is a side view of the auger of the appliance of FIG. 1.

The auger 46 illustrated in FIG. 11 is tapered an angle α from a first end to a second end. The auger 46 is tapered at the angle α for the purposes of aiding removal of the auger 46 from a mold. In the illustrated embodiment, the angle α is 3°. However, this is not meant to be limiting as there may be other angles α that may be suitable for aiding removal of the auger 46 from a mold. Similarly, the feed column 40 (FIGS. 3 and 4) is tapered the angle α so that the contours of auger 46 matches the contour of the inside of the feed column 40 and auger 46 may rotate freely therein. The taper at the angle α also facilitates the removal of the feed column 40 from a mold. The sidewalk of the blending jar 20 (FIGS. 3 and 4) may be similarly tapered for facilitating removal from a mold.

Figure 12:
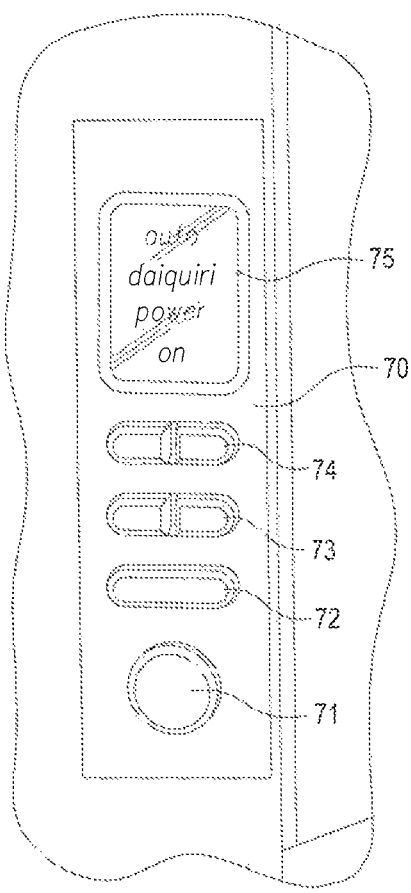
FIG. 12 is an enlarged front view of the electronic control panel of the appliance of FIG. 1.

Referring now to FIG. 12, the control panel 70 includes a power switch 71 for providing electrical power to the control panel 70 from the electrical power cord (not shown). The electrical power cord (not shown) may be connected to a conventional source of ac power such as 120 vac household current. Located above the power switch 710 is a pulse/stop switch 72 for manually operating the agitator motor 55 (FIG. 8) for brief periods in a pulse fashion or shutting off current to the agitator motor 55 (FIG. 8) when energized in any one of the manners described below. An lcd display 75 is provided which displays whether the power is "on" or "off".

In an embodiment, the control panel 70 includes electronic controls for both manually and intuitively controlling the agitator motor 55 (FIG. 8) to provide desired blending results. For example, in the illustrated embodiment, a rocker switch or button 74 may be used to select pre-programmed recipes for selected types of drinks such as daiquiris, milkshakes, smoothies and margaritas. When button 74 is depressed in a first direction, the above selections may be displayed on a display 75. Button 74 may be used to navigate through the selections and depressed in a second direction to select the desired selection and cause a microprocessor MP1 (FIG. 13) to commence the agitator motor 55 (FIG. 8) sequences according to the selected beverage recipe stored in MP1. When controlling the agitator motor using the intuitive or automatic control button 74, the lcd display may display the legend "auto".

Alternately, a manual rocker switch or button 73 may be depressed for controlling the agitator motor to provide blending results according to user preference. For example, when button 73 is depressed in a first direction, low, medium and high speed settings for agitator motor 55 (FIG. 8) selections may be displayed on the lcd display 75. Button 73 may be used to navigate through the selections wherein button 73 may be depressed in a second direction to select the desired selection and cause the microprocessor MP1 to commence the agitator motor 55 FIG. 8) sequences according to the speed selection. Blending at higher speeds typically provides blended contents of a finer consistency with smaller chunks of solid contents such as fruit or chocolate. Blending at slower speeds such as medium or slow speed typically provides blended contents of a coarser consistency with larger chunks of solid contents. When blending using the manual button 73, the legend "manual" may be displayed on the lcd display 75.

The various switches 71, 72, 73 and 74 described with reference to the control panel 70 may be any kind of push button, membrane, or touch sensitive buttons or switch known in the art which sends a signal or command, or closes/opens a circuit when pressed or touched by the user. In addition, if desired, the display 75 may be a touch-sensitive screen, whereby a user may input operation functions by touching the screen. Additional control methods may also be used, such as voice-recognition programs, remote controls, or other features.

Figure 8:
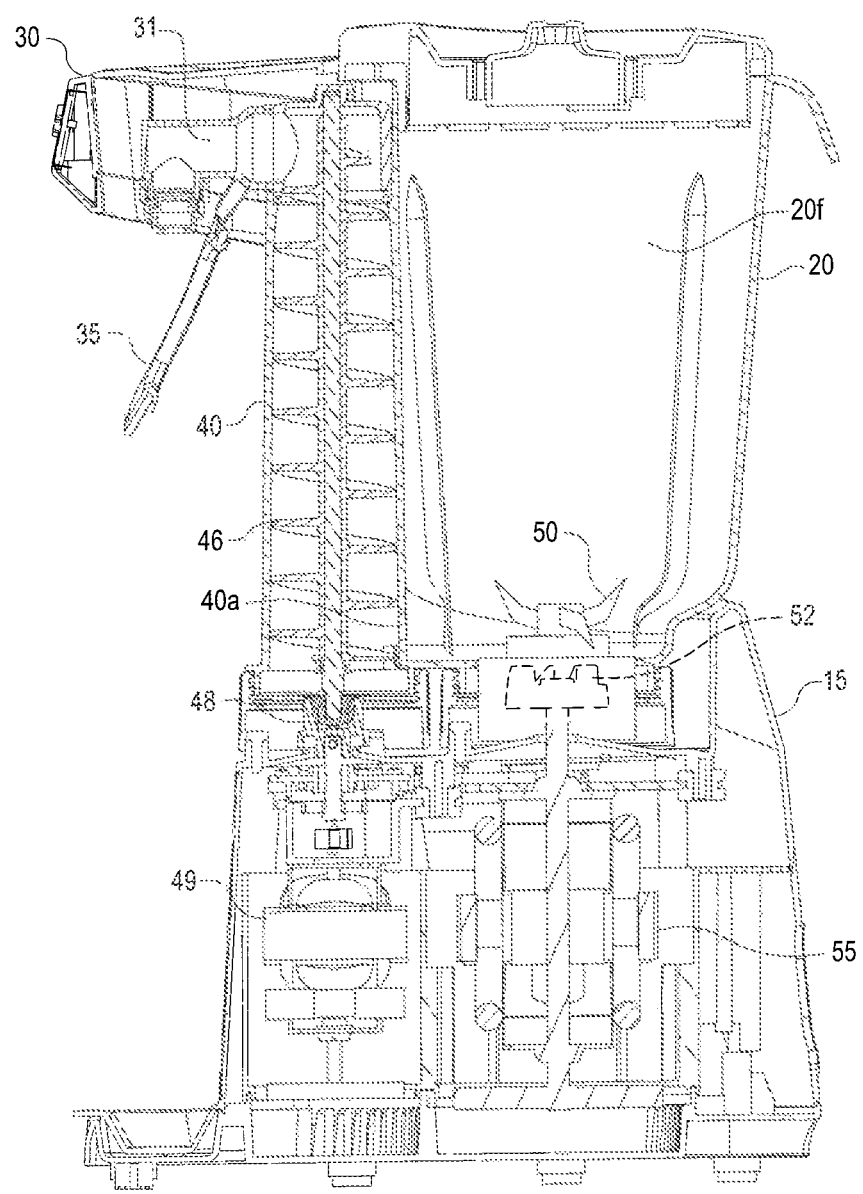
FIG. 8 is a side cross-sectional view of the appliance of FIG. 1 taken along line 8-8 of FIG. 7.
Figure 9:
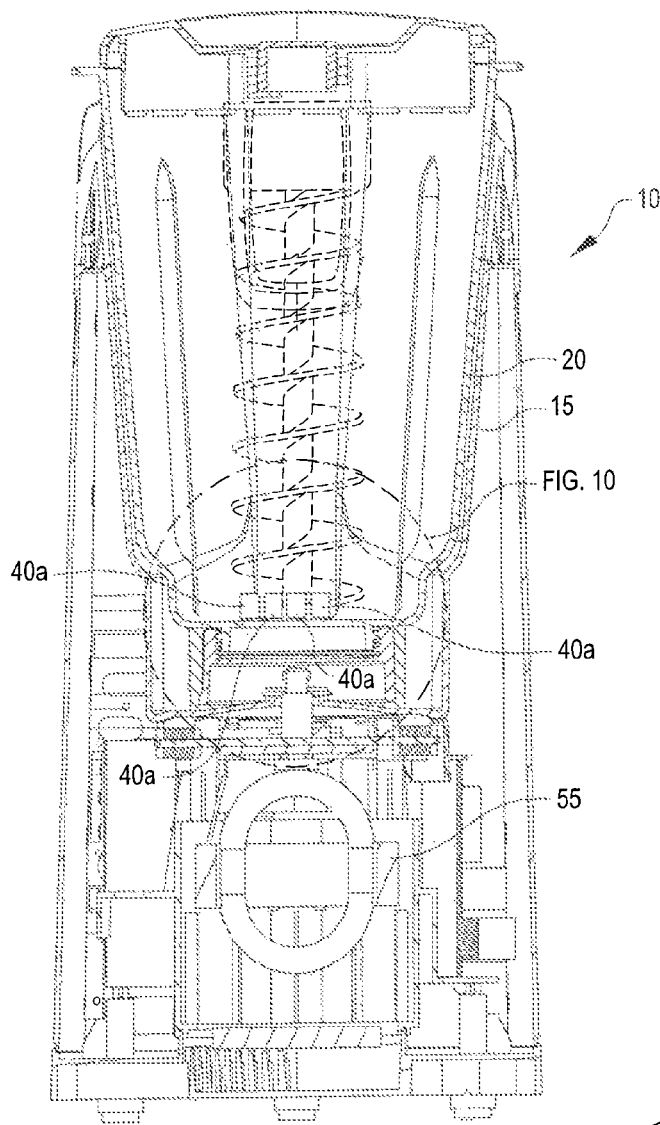
FIG. 9 is a rear cross-sectional view of the appliance of FIG. 1 taken along line 9-9 of FIG. 7.
Figure 10:
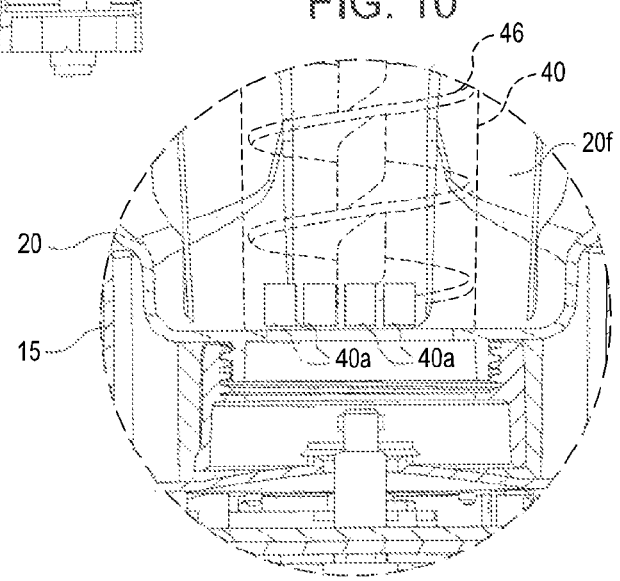
FIG. 10 is an enlarged view of a portion of the cross-sectional view of FIG. 9 of the appliance of FIG. 1.
Figure 13:
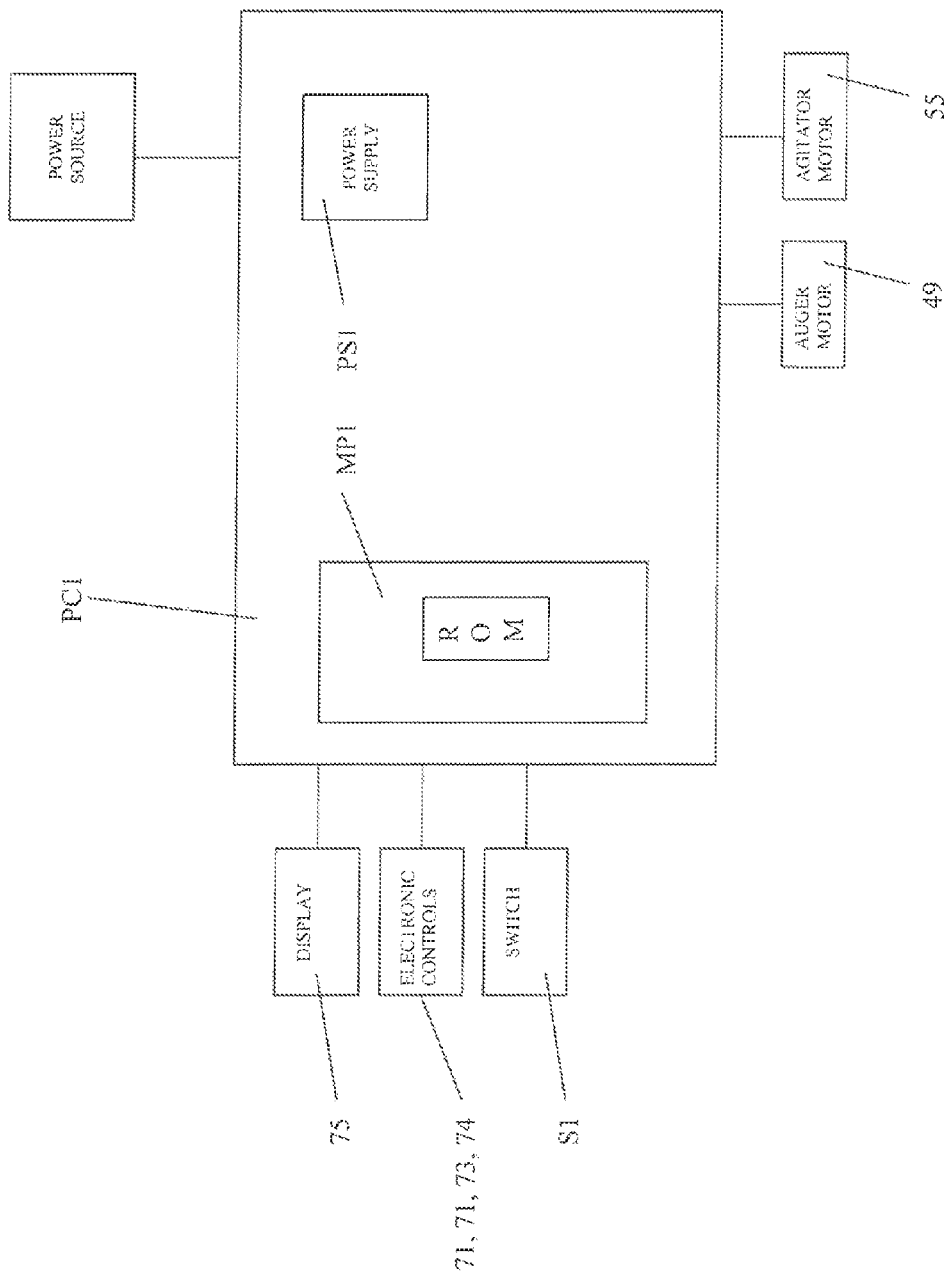
FIG. 13 is a block diagram of the electronic control system of the appliance of FIG. 1.

Referring now to FIG. 13, a circuit board PC1 mounts circuitry and logic allowing the user of the appliance 10 to select pre-programmed blending cycles. The circuit board PC1 is built around a microprocessor MP1. In an embodiment, the microprocessor MP1 can be an application-specific integrated circuit (ASIC) programmable controller or similar device. The ASIC programmable controller may also include an algorithm for controlling the operation of the blending appliance 10 (FIG. 1), and at least enough memory to store the algorithm in ROM (read only memory). However, although described with these specific components, the microprocessor MP1 may include any software or hardware components that enable it to perform the functions described herein. The microprocessor MP1 is connected to or interfaced with the electronic controls 71, 72, 73, 74 on control panel 70, display 75, contact switch SW1 (FIG. 5), a power source, and auger and agitator motors 49, 55 (FIG. 8).

Figure 7:
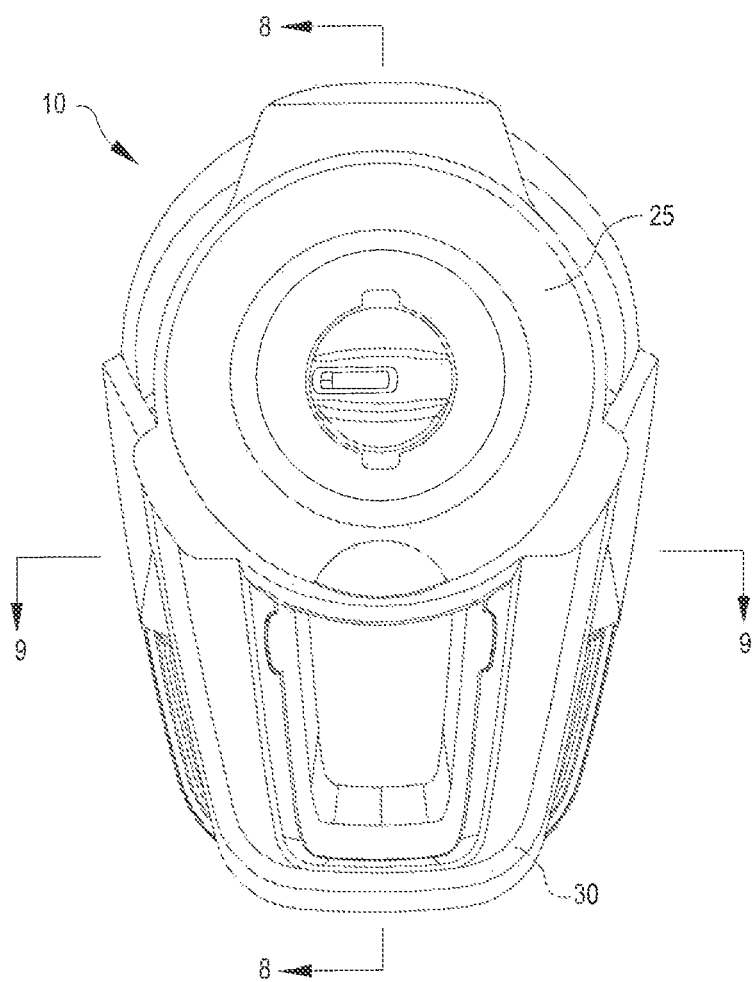
FIG. 7 is top view of the appliance of FIG. 1.

In an embodiment, the programmable controller can include a variety of stored pre-programmed sequences associated with a recipe for agitating and blending a blended beverage of a desired consistency to be dispensed. The pre-programmed sequences for various blended beverage recipes are stored in nonvolatile memory M accessible by the microprocessor MP1. The stored sequences for the recipes include blended beverage specific agitating and blending parameters which include time based agitation settings (the time agitator motor 55 in FIG. 7 is energized) through a blending cycle. The sequences for a particular recipe are selected via controls on the control panel 70 (FIG. 12) which are displayed on the display 75 for selection. The microprocessor MP1 may also be used to control the operation of the auger drive motor 49 (FIG. 8). The auger motor 49 is energized by MP1 in a forward direction when the switch S1 (FIG. 5) is closed when dispensing arm 35 is depressed. The auger motor 49 is energized and rotated at a speed stored in memory M according to a desired dispensing flow rate from dispensing nozzle assembly 31 (FIGS. 3 and 4).

Oppositely, the auger drive motor 49 (FIG. 8) is energized by microprocessor MP1 in a reverse direction when microprocessor MP1 energizes agitator drive motor 55 according to the selected manual or stored program to prevent blended beverage from being dispensed during operation of the agitator drive motor 55 and the buildup of particulate matter in the area of the apertures 40a (FIGS. 9 and 10) as described above.

The microprocessor M1 may be provided with the desired electrical power by a power supply PS1 disposed on the printed circuit board PC1. The power supply PS1 may be connected via an electrical cord (not shown) to a source of conventional electrical power such as 120 vac household current. The power supply PS1 may then rectify the ac electrical power to DC power and output a desired voltage that is appropriate for use with the microprocessor MP1.

Figure 14:
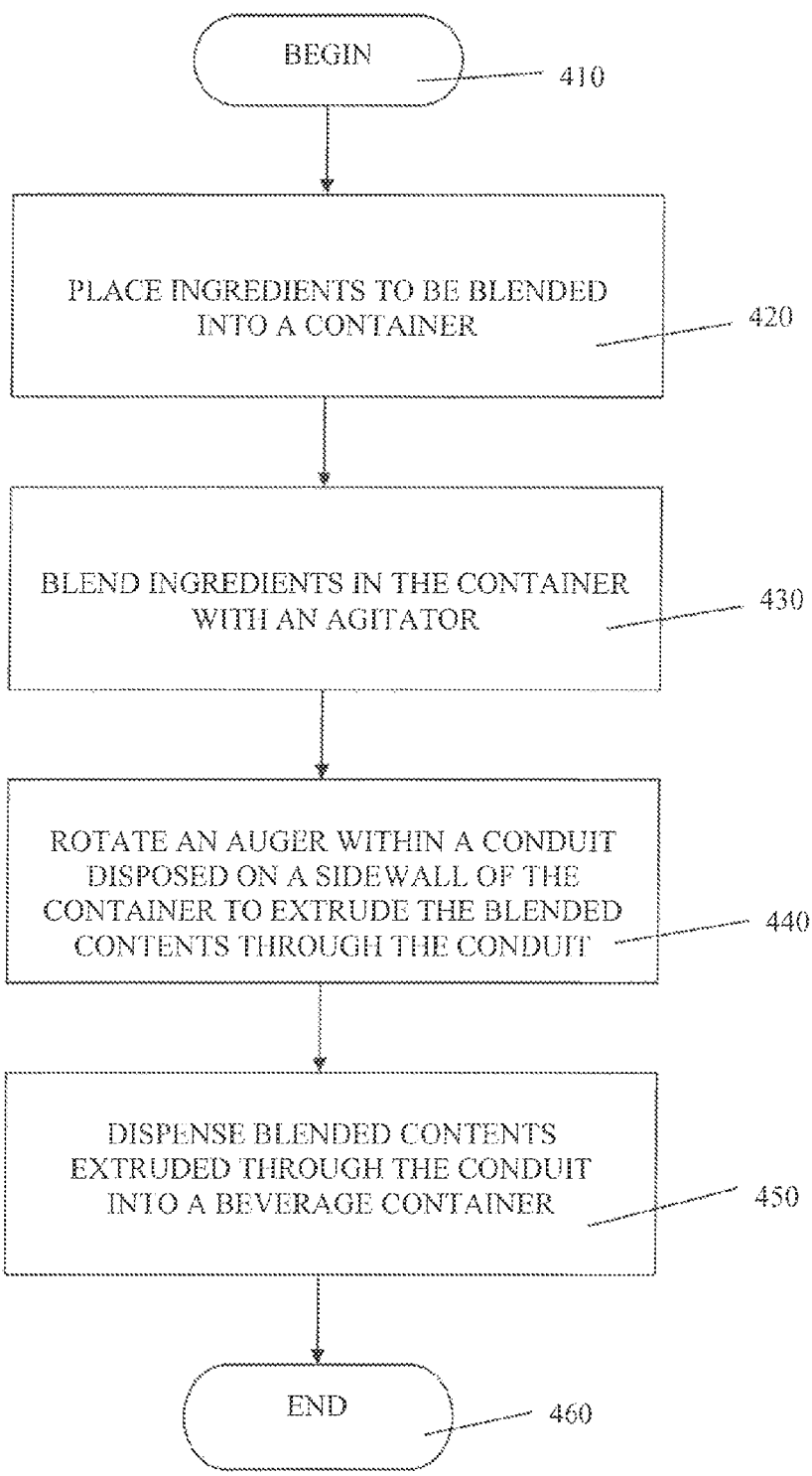
FIG. 14 is a flowchart of a method for dispensing and blending a beverage with the appliance of FIG. 1.

In another aspect of the invention, as illustrated in the flowchart of FIG. 14, there is provided a method 400 of blending and dispensing a beverage with the blending and dispensing appliance shown and described in FIGS. 1-13. The method 400 begins at step 410. The method 400 further includes the step 420 of placing ingredients to be blended into a container 20. The method 400 further includes the step 430 of blending ingredients in the container 20 with an agitator 50. The method 400 further includes the step 440 of rotating an auger 46 within a conduit 40 disposed on a sidewall of the container 20 to extrude the blended contents through the conduit 40. The method 400 further includes the step 450 of dispensing blended contents extruded through the conduit 40 into a beverage container. The method ends at step 460.

The method 400 may include the additional step of rotating the auger 46 in a first direction when a dispensing arm 35 is depressed causing blended contents to be extruded through the conduit 40 from the blending container 30 to a spout 31 fluidly connected to the conduit 40 for further dispensing into a beverage container, the blending container being fluidly connected to said conduit 40 through a port 40a. This step may include the additional step of rotating the auger 46 in the first direction by energizing an auger motor 49 controlled by a control system which receives an electrical signal from a switch S1 operatively connected to the dispensing arm 35 and closed when the dispensing arm 35 is depressed.

The method 400 may include rotating the auger 46 in a second direction when the ingredients in the container 20 are blended with the agitator 50, said rotation of the auger 46 in the second direction causing residual contents in the conduit 40 to be extruded back into said container 20 from said conduit 40 through said port 40a. This step may further include the step of rotating the agitator 50 by energizing an agitator motor 55 controlled by a control system which includes a microprocessor MP1 with memory storing a plurality of pre-programmed sequences for operation of the agitator 50 for a desired outcome of a consistency of a desired blended beverage.

The method 400 may further include the step of depressing a plurality of switches 72, 73 and 74 to selectively display on a display 75 a selection of the desired blended beverages associated with the pre-programmed sequences and selecting via the switches 72, 73 and 74 one of the selections of desired blending beverages to cause the agitator 50 to perform the associated pre-programmed sequence for the selected desired blended beverage of desired consistency.

The method 400 may further include the step of rotating the auger 46 in the second direction by energizing an auger motor 49 controlled by the control system when the agitator motor 55 is energized.

All references cited herein are expressly incorporated by reference in their entirety.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A blending and dispensing appliance, comprising:
a blending container;
a housing for receiving and supporting the blending container;
an agitator disposed in the blending container configured to agitate contents placed into the blending container;
a motorized base disposed in the housing and configured to couple to the agitator to selectively provide rotary power to the agitator;
a conduit integrally formed on an outer sidewall of the blending container and fluidly connected to the blending container at a lower end;
a port at a bottom of the blending container for fluidly connecting the blending container to the lower end of the conduit; and an auger disposed within the conduit and configured to rotate in a first direction within the conduit, said auger being rotatably coupled to the motorized base to selectively pump blended contents from within the blending container through said port and said lower end of the conduit to an upper end of said conduit when rotated in the first direction.

2. The blending and dispensing appliance of claim 1, further comprising a dispensing arm pivotally attached to the housing and movable between first and second positions, said dispensing arm being biased into the first position and when depressed by a beverage container into the second position causes said auger to be rotated in the first direction to pump blended contents from within said interior volume through said conduit to said upper end into said beverage container.

3. The blending and dispensing appliance of claim 2, further comprising a spout fluidly connected to said upper end configured to direct blended contents into said beverage container when said dispensing arm is depressed into the second position.

4. The blending and dispensing appliance of claim 2, comprising a control system configured to control operation of the motorized base to selectively provide rotary power to said agitator and said auger.

5. The blending and dispensing appliance of claim 4, wherein said control system selectively energizes and de-energizes an agitator motor disposed in the base for providing rotary power to the agitator.

6. The blending and dispensing appliance of claim 4, wherein said control system selectively energizes and de-energizes an auger motor disposed in the motorized base for providing rotary power to the auger.

7. The blending and dispensing appliance of claim 6, further comprising a switch operatively connected to said dispensing arm and said control system, said switch being closed when said dispensing arm is depressed into the second position which causes said control system to energize said auger motor and rotate in the first direction to pump blended contents from within said interior volume through said conduit to said second upper end into said beverage container and de-energize the auger motor when the dispensing arm is released.

8. The blending and dispensing appliance of claim 7, wherein said control system energizes said auger motor to rotate the auger in a second direction when said control system energizes said agitator motor to blend contents in said blending container, said auger rotating in the second direction causing any residual contents in said conduit to be pumped back into said blending container through said lower end and said port.

9. The blending and dispensing appliance of claim 8, wherein said control system includes a display, a plurality of switches, and a microprocessor operatively connected to the switches, said microprocessor including memory containing encoded instructions for a plurality of pre-programmed sequences for operation of the agitator for a desired outcome of an associated consistency of a desired blended beverage, said plurality of switches configured to be depressed to selectively display on the display a selection of the desired blended beverages associated with each of the pre-programmed sequences and to select one of the selections of desired blending beverages and cause the agitator to perform the associated pre-programmed sequence to blend the contents to the desired associated consistency.

10. The blending and dispensing appliance of claim 3, wherein said spout is secured to said upper end of said conduit with latches and is removable for cleaning.

11. The blending and dispensing appliance of claim 1, wherein said blending container and said port are configured to optimally allow the flow of blended contents between said blending container and said conduit while preventing the buildup of particles of blended contents in a region in proximity to said port.

12. The blending and dispensing appliance of claim 1, wherein said port is comprised of one or more openings in a portion of the outer sidewall of the blending container where the conduit is disposed.

13. The blending and dispensing appliance of claim 1, wherein said conduit is disposed vertically on the outer sidewall of the blending container and the auger is disposed vertically within said conduit.

14. A blending and dispensing appliance, comprising:
a blending container;
a housing for receiving and supporting the blending container;
an agitator disposed in the blending container configured to agitate contents placed into the blending container;
a motorized base disposed in the housing and configured to couple to the agitator to selectively provide rotary power to the agitator;
a conduit disposed on an outer sidewall of the blending container and fluidly connected to the blending container at a first end;
a port for fluidly connecting the blending container to the first end of the conduit;
an auger disposed within the conduit and configured to rotate in both a first and second direction within the conduit, said auger being rotatably coupled to the motorized base to selectively pump blended contents from within the blending container through said port and said first end of the conduit to a second end of said conduit when rotated in the first direction; and
a dispensing arm pivotally attached to the housing and movable between first and second positions, said dispensing arm being biased into the first position and when depressed by a beverage container into the second position causes said auger to be rotated in the first direction to pump blended contents from within said interior volume through said conduit to said second end into said beverage container.

15. The blending and dispensing appliance of claim 14, further comprising a spout fluidly connected to said second end configured to direct blended contents into said beverage container when said dispensing arm is depressed into the second position.

16. The blending and dispensing appliance of claim 15, comprising a control system configured to control operation of the motorized base to selectively provide rotary power to said agitator and said auger.

17. The blending and dispensing appliance of claim 16, wherein said control system selectively energizes and de-energizes an agitator motor disposed in the base for providing rotary power to the agitator.

18. The blending and dispensing appliance of claim 16, wherein said control system selectively energizes and de-energizes an auger motor disposed in the motorized base for providing rotary power to the auger.

19. The blending and dispensing appliance of claim 18, further comprising a switch operatively connected to said dispensing arm and said control system, said switch being closed when said dispensing arm is depressed into the second position which causes said control system to energize said auger motor and rotate in the first direction to pump blended contents from within said interior volume through said conduit to said second end into said beverage container and de-energize the auger motor when the dispensing arm is released.

20. The blending and dispensing appliance of claim 19, wherein said control system energizes said auger motor to rotate the auger in the second direction when said control system energizes said agitator motor to blend contents in said blending container, said auger rotating in the second direction causing any residual contents in said conduit to be pumped back into said blending container through said first end and said port.

21. The blending and dispensing appliance of claim 20, wherein said control system includes a display, a plurality of switches, and a microprocessor operatively connected to the switches, said microprocessor including memory containing encoded instructions for a plurality of pre-programmed sequences for operation of the agitator for a desired outcome of an associated consistency of a desired blended beverage, said plurality of switches configured to be depressed to selectively display on the display a selection of the desired blended beverages associated with each of the pre-programmed sequences and to select one of the selections of desired blending beverages and cause the agitator to perform the associated pre-programmed sequence to blend the contents to the desired associated consistency.

22. The blending and dispensing appliance of claim 15, wherein said spout is secured to said second end of said conduit with latches and is removable for cleaning.

23. The blending and dispensing appliance of claim 15, wherein said port is comprised of one or more openings in a portion of the outer sidewall of the blending container where the conduit is exposed.

24. The blending and dispensing appliance of claim 15, wherein said conduit is disposed vertically on the outer sidewall of the blending container and the auger is disposed vertically within said conduit.

\* \* \* \* \*